(12) United States Patent
Mizuno et al.

(10) Patent No.: US 7,797,482 B2
(45) Date of Patent: Sep. 14, 2010

(54) METHOD OF READING FROM AND WRITING TO A STORAGE DISK, AND STORAGE DISK CONTROL UNIT

(75) Inventors: Hidemichi Mizuno, Kyoto (JP); Shiro Eshita, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1206 days.

(21) Appl. No.: 10/595,224

(22) PCT Filed: Jun. 15, 2005

(86) PCT No.: PCT/JP2005/011394

§ 371 (c)(1),
(2), (4) Date: Mar. 27, 2006

(87) PCT Pub. No.: WO2005/124529

PCT Pub. Date: Dec. 29, 2005

(65) Prior Publication Data

US 2008/0253013 A1    Oct. 16, 2008

(30) Foreign Application Priority Data

Jun. 21, 2004 (JP) ............................. 2004-182270

(51) Int. Cl.
*G06F 12/00* (2006.01)
(52) U.S. Cl. ........................ 711/112; 711/170; 710/52
(58) Field of Classification Search ................ 711/112, 711/114, 170; 710/52; 360/51
See application file for complete search history.

(56) References Cited

U.S. PATENT DOCUMENTS

| 6,687,254 B1 * | 2/2004 | Ho et al. ..................... 370/412 |
| 7,213,087 B1 * | 5/2007 | Bertone et al. ................ 710/56 |
| 2006/0109580 A1 * | 5/2006 | Kisaka et al. ................. 360/51 |

FOREIGN PATENT DOCUMENTS

| JP | 02-59923 | 2/1990 |
| JP | 04-336317 | 11/1992 |
| JP | 06-180635 | 6/1994 |
| JP | 2004-103103 | 4/2004 |

OTHER PUBLICATIONS

International Search Report for PCT Application No. PCT/JP2005/011394, mailed Sep. 13, 2005.

* cited by examiner

*Primary Examiner*—Pierre-Michel Bataille
(74) *Attorney, Agent, or Firm*—Keating & Bennett, LLP (57) ABSTRACT

A storage disk control unit is provided with a buffer management table that defines correspondence between the sectors of a storage disk and the buffer spaces of the storage disk control unit. Based on the buffer management table, common buffer spaces to be shared by a multiplicity of sectors and individual buffer spaces allocated for other individual sectors are reserved in the buffer means (RAM) of the storage disk control unit. Accordingly, an USB-FDD can perform high-speed read/write operations while minimizing the buffer capacity of the RAM. Further, the buffer spaces reserved for read/write operations can be accommodated in accordance with the use condition of storage disk and the need of the RAM for other purposes.

11 Claims, 7 Drawing Sheets

| SECTOR | BUFFER SPACE | | UNPROCESSED STATUS FLAG |
|---|---|---|---|
| 1 | A | (R) | 1 |
| 2 | B | (Q) | 1 |
| 3 | C | (P) | 1 |
| 4 | D | (O) | 1 |
| . | . | | . |
| . | . | | . |
| . | . | | . |
| N − 6 | P | (C) | 1 |
| N − 5 | Q | (B) | 1 |
| N − 4 | R | (A) | 1 |
| N − 3 | Q | (B) | 0 |
| N − 2 | R | (A) | 0 |
| N − 1 | Q | (B) | 0 |
| N | R | (A) | 0 |

| SECTOR | BUFFER SPACE | UNPROCESSED STATUS FLAG |
|---|---|---|
| 1 | A | 0 |
| 2 | B | 0 |
| 3 | A | 0 |
| 4 | B | 0 |
| 5 | A | 0 |
| 6 | B | 0 |
| 7 | C | 1 |
| 8 | D | 1 |
| ⋮ | ⋮ | ⋮ |
| N−2 | P | 1 |
| N−1 | Q | 1 |
| N | R | 1 |

| BUFFER SPACE | ASSOCIATED SECTOR(S) |
|---|---|
| A | SHARED BY SECTORS 1 - 6 |
| B | SHARED BY SECTORS 1 - 6 |
| C | SECTOR 7 |
| D | SECTOR 8 |
| . | . |
| . | . |
| . | . |
| . | . |
| P | SECTOR N-2 |
| Q | SECTOR N-1 |
| R | SECTOR N |

FIG. 5

| SECTOR | BUFFER SPACE | UNPROCESSED STATUS FLAG |
|---|---|---|
| 1 | A  (R) | 1 |
| 2 | B  (Q) | 1 |
| 3 | C  (P) | 1 |
| 4 | D  (O) | 1 |
| ⋮ | ⋮ | ⋮ |
| N − 6 | P  (C) | 1 |
| N − 5 | Q  (B) | 1 |
| N − 4 | R  (A) | 1 |
| N − 3 | Q  (B) | 0 |
| N − 2 | R  (A) | 0 |
| N − 1 | Q  (B) | 0 |
| N | R  (A) | 0 |

| BUFFER SPACE | ASSOCIATED SECTOR(S) |
|---|---|
| A | SECTOR 1 |
| B | SECTOR 2 |
| C | SECTOR 3 |
| D | SECTOR 4 |
| . | . |
| . | . |
| . | . |
| . | . |
| P | SECTOR N-6 |
| Q | SHARED BY SECTORS N - N-5 |
| R | SHARED BY SECTORS N - N-5 |

# METHOD OF READING FROM AND WRITING TO A STORAGE DISK, AND STORAGE DISK CONTROL UNIT

TECHNICAL FIELD

This invention relates to a method of reading from and writing to a storage disk drive such as a flexible disk drive (FDD) connected to a serial data transfer means such as an USB, and to a storage disk control unit utilizing such method.

RELATED ART

Conventionally, FDDs compatible with an USB (hereinafter referred to as USB-FDD unit) have been widely used as means for reading/writing data from/to a flexible disk (FD).

In an USB-FDD unit, a read/write head is first moved to a target track of the FD to read or write data.

In a read operation, data are read out in sequence from a multiplicity (N) of sectors of the track in the order of sectors starting with the leading sector (also referred to as sector 1) and down to the last sector (sector N). The data are sequentially sent out via an USB in the same order of the sectors mentioned. In this case, the FD rarely happens to be located at an angular position where the leading sector of the track is located at the read head of the storage disk drive. Therefore, it is usually the case that it takes some time for the leading sector of the track to come to the read position of the drive.

Sequential read of the data from sectors 1 through N on the track is started with the sector 1 when FD has rotated such that the sector 1 is located at the read position. The data read out are temporarily stored in a buffer (e.g. a RAM) of the USB-FDD unit before it is subsequently sent out to an external host computer, for example, via the USB.

In a write operation, write is withheld until the FD rotates to a position where data can be written to the leading sector of a target track. When the FD has rotates to that position, the data, sent from an external host computer for example and temporarily stored in the buffers (RAM) of the USB-FDD unit, is sequentially written to the sectors 1 through N of the track in the order of the sectors.

In these read/write operations, read and write are always started with the leading sector of a track, so that read/write operations entail rotational latency or delay since it takes time for the leading sector to come to the head position.

In order to alleviate such delay due to rotational latency, Japanese Patent Application Laid Open No. 2004-103103 (hereinafter referred to as Patent Document 1) discloses a method of reading/writing data in which read/write is started with the very sector next to the current sector located at the head, based on the sector number of the current sector that is read prior to starting the read/write operation.

In the method of the Patent Document 1, read/write time can be short, but the order of the sectors accessed for read/write depends on the rotational position of the FD, which is not in good order, i.e. the sequence of the sectors are disordered. On the other hand, a host computer communicating with the USB-FDD unit always demands data to be obtained from the sectors in correct order. Thus, basically, it is necessary for the USB-FDD unit to have a buffer or RAM that has a sufficient storage capacity to store the whole data on one (complete) track of an FD. However, since USB-FDD units are expected to be fast, compact, and cost effective, it is not preferable to increase the buffer capacity of the RAM.

It is, therefore, an object of the invention to provide a storage disk drive unit including a storage disk drive, such as an FDD, connected to serial data transfer means such as an USB to perform high-speed data transfer with a reduced RAM buffer capacity in accordance with the use condition of the storage disk drive.

It is another object of the invention to provide a method of reading/writing data from/to such data storage disk drive.

It is a still another object of the invention to provide a method of managing the buffer spaces of the RAM used in the read/write operations in accordance with the use condition of the storage disk drive and the need of buffer spaces.

SUMMARY OF THE INVENTION

An inventive method of reading data from a storage disk having a multiplicity N of sectors uses a storage disk drive that includes serial data transfer means and buffer means, and comprises:

a step of allocating common buffer spaces of the buffer means to sectors 1 through K (K<N) of the storage disk, where K is a predetermined number, and allocating individual buffer spaces of the buffer means to sectors (K+1) through N of the storage disk;

a sequence of steps repeated for each of the N sectors in response to a read request, the sequence including steps of
  (i) determining the sector to be read next (the sector hereinafter referred to as next readable sector) based on the current rotational position of the storage disk,
  (ii) reading data from the next readable sector,
  (iii) storing (or buffering) the data read out in step (ii) in the buffer space allocated to the next readable sector, and
  (iv) setting a flag (referred to as unprocessed status flag) indicative of the data stored being unprocessed for the flag whose data has been stored in its associated buffer space; and a sequence of steps also repeated for each of the N sectors in the order of the sectors, starting with sector 1, in response to the read request, the sequence including steps of
  (v) transferring data, via the serial data transfer means, from a buffer space allocated to an associated sector to an external device, on condition that an unprocessed status flag is set for that sector, and
  (vi) clearing the flag for the sector whose data has been transferred from its associated buffer space.

In the method of reading data from a storage disk, in the initial stage of a read operation, the next readable sector determined in the step (i) is the sector K+1 if the rotational position of the storage disk lies within the range from sector 1 through sector K, while the next readable sector is the sector next to the one currently located at the rotational position of the storage disk if the rotational position of the storage disk has passed sector K.

In the method of reading data from a storage disk, if, in step (iii) of storing (or buffering) data of a sector in an allocated buffer space in the initial stage of a read operation, the data belongs to one of sectors 1 through K, then buffering of the data can be omitted to start sequential buffering with sector K+1.

In the method of reading data from a storage disk, the next readable sector determined in the step (i) is the sector next to the one at the rotational position of the storage disk irrespective of the sector number of the sector located at the rotational position in the initial stage of a read operation, and the data is stored (buffered) in an associated buffer space in step (iii) in the initial stage of the read operation, irrespective of the number of the sector read in step (ii).

In the method of reading data from a storage disk, the next readable sector determined in the step (i) is the sector next to the one located at the rotational position of the storage disk, and all the flags for the sectors associated with the same buffer spaces as the next readable sector are cleared in step (iv) if the next readable sector belongs to sectors 1 through K.

In the method of reading data from a storage disk, the common buffer spaces may include at least two buffer spaces together forming a ring buffer.

An inventive method of writing data to a multiplicity N of sectors of a storage disk using a storage disk drive having serial data transfer means and buffer means comprises:

a step of allocating individual buffer spaces of the buffer means to the sectors 1 through J (J<N) of the storage disk, where J is a predetermined integer, and allocating common buffer spaces of the buffer means to sectors J+1 through N of the storage disk;

a sequence of steps repeated for each of the N sectors in the order of the sectors, starting with sector 1, in response to a write request, the sequence including steps of    (vii) storing the data received from an external device via the serial data transfer means in an associated buffer space, on condition that the unprocessed status flag has been cleared for the sector associated with the buffer space, and    (viii) setting an unprocessed status flag for the sector whose data has been stored in its associated buffer;

a sequence of steps repeated for each of the N sectors in response to the write request, the sequence including steps of    (ix) determining the next writable sector based on the rotational position of the storage disk,    (x) writing data in the next writable sector, on condition that an unprocessed status flag is set for the next writable sector, and    (xi) clearing the flag for the sector to which data has been written.

In the method of writing data in the storage disk, the next writable sector determined in the step (ix) is the sector next to the one located at the rotational position.

In the method of writing data in the storage disk, the common buffer spaces may include at least two buffer spaces together forming a ring buffer.

A storage disk control unit of the invention comprises:

serial data transfer means USBC 11;

buffer means 15;

storage disk control means including FDC 16 and FDD 17;

a buffer management table for establishing correspondence between a multiplicity N of sectors of a storage disk and a group of buffer spaces of the buffer means including common buffer spaces and individual buffer spaces; and a CPU 14, connected to each of the serial data transfer means USB 11, buffer means 15, storage disk control means FDC 16 and FDD 17, and the buffer management table, for controlling these components 11-17 and the buffer management table, wherein (1) in a read operation, the CPU is adapted to set the buffer management table such that the common buffer spaces of the buffer means are allocated to the first K sectors (K<N), where K is a predetermined integer, and individual buffer spaces of the buffer means are allocated to sectors K+1 through N;

repeat a sequence of steps for each of the N sectors in response to a read request, the sequence including steps of    (i) determining the sector to be read next (next readable sector) based on the current rotational position of the storage disk,    (ii) reading data from the next readable sector,    (iii) storing (or buffering) the data read out in step (ii) in the buffer space allocated to the next readable sector, and    (iv) setting a flag (referred to as unprocessed status flag) indicative of the stored data being unprocessed for the sector whose data has been stored in its associated buffer space;

repeat a sequence of steps for each of the N sectors in the order of the sectors, starting with sector 1, in response to the read request, the sequence including steps of    (v) transferring data, via the serial data transfer means, from a buffer space allocated to a sector to an external device, on condition that an unprocessed status flag is set for that sector, and    (vi) clearing the flag for the sector whose data has been transferred from its associated buffer space;

(2) in a write operation, the CPU is adapted to set the buffer management table such that the individual buffer spaces of the buffer means are allocated to sectors 1 through J (J<N), where J is a predetermined integer, and the common buffer spaces of the buffer means are allocated to sectors J+1 through N;

repeat a sequence of steps for each of the N sectors in the order of the sectors starting with sector 1, in response to a write request, the sequence including steps of    (vii) storing the data received from an external device via the serial data transfer means in a buffer space allocated to a sector, on condition that an unprocessed status flag has been cleared for that sector, and    (viii) setting an unprocessed status flag for the sector whose data has been stored in the associated buffer;

repeat a sequence of steps for each of the N sectors in response to the write request, the data processing including steps of    (ix) determining the next writable sector based on the current rotational position of the storage disk,    (x) writing data in the next writable sector, on condition that an unprocessed status flag is set to the next writable sector, and    (xi) clearing the flag for the sector to which the data has been written.

In the storage disk control unit, the K, J, and the multiplicity N may be set to satisfy J=N−K.

According to the invention, the number of buffer spaces of a buffer means for use in read and write can be changed without modifying the hardware configuration of the buffer means, which enables construction of a flexible system that can trade off between the storage capacity and the speed of the buffer means (e.g. RAM buffer).

It is also noted that the inventive buffer means can be anticipated to provide substantially the same speed as the buffer means having buffer spaces for the entire sectors as disclosed in the Patent Document 1, though the speed depends on the data transfer rate of the serial data transfer means connected thereto and use conditions of other devices.

The inventive storage disk control unit, embodied typically in the form of an USB-FDD unit, is compatible with various types of disk formats, and may have varied speeds and buffer capacities required by disks in different formats. In the invention, the buffer means can be appropriately managed in different ways to exploit maximum performance of the buffer means for a storage disk of a given format.

If the number of usable buffer spaces of the buffer means is limited, still maximum performance of the storage disk drive unit can be obtained for the limited buffer resource by fully utilizing it to its maximum buffer capacity. Further, when the speed of the storage disk drive is not critically important, the number of buffer spaces usable as read/write buffers can be reduced to utilize the remaining buffer spaces for other purposes or to minimize the buffer resource (e.g. hardware RAM).

BEST MODES FOR CARRYING OUT THE INVENTION

With reference to the accompanying drawings, a storage disk drive such as an FDD (flexible disk drive) connected to a serial data transfer means such as an USB (Universal Serial Bus) according to the invention will now be described, along with an inventive method of reading/writing data from/to such storage disk drive.

In the example shown herein, an USB is used as a serial data transfer means, an FD as a storage disk, and a RAM having predetermined buffer spaces as a buffer means. However, it should be understood that the invention is not limited to this example, and that other serial data transfer means, storage disk, and buffer means equivalent to the respective examples shown can be alternatively used.

Figure 1:
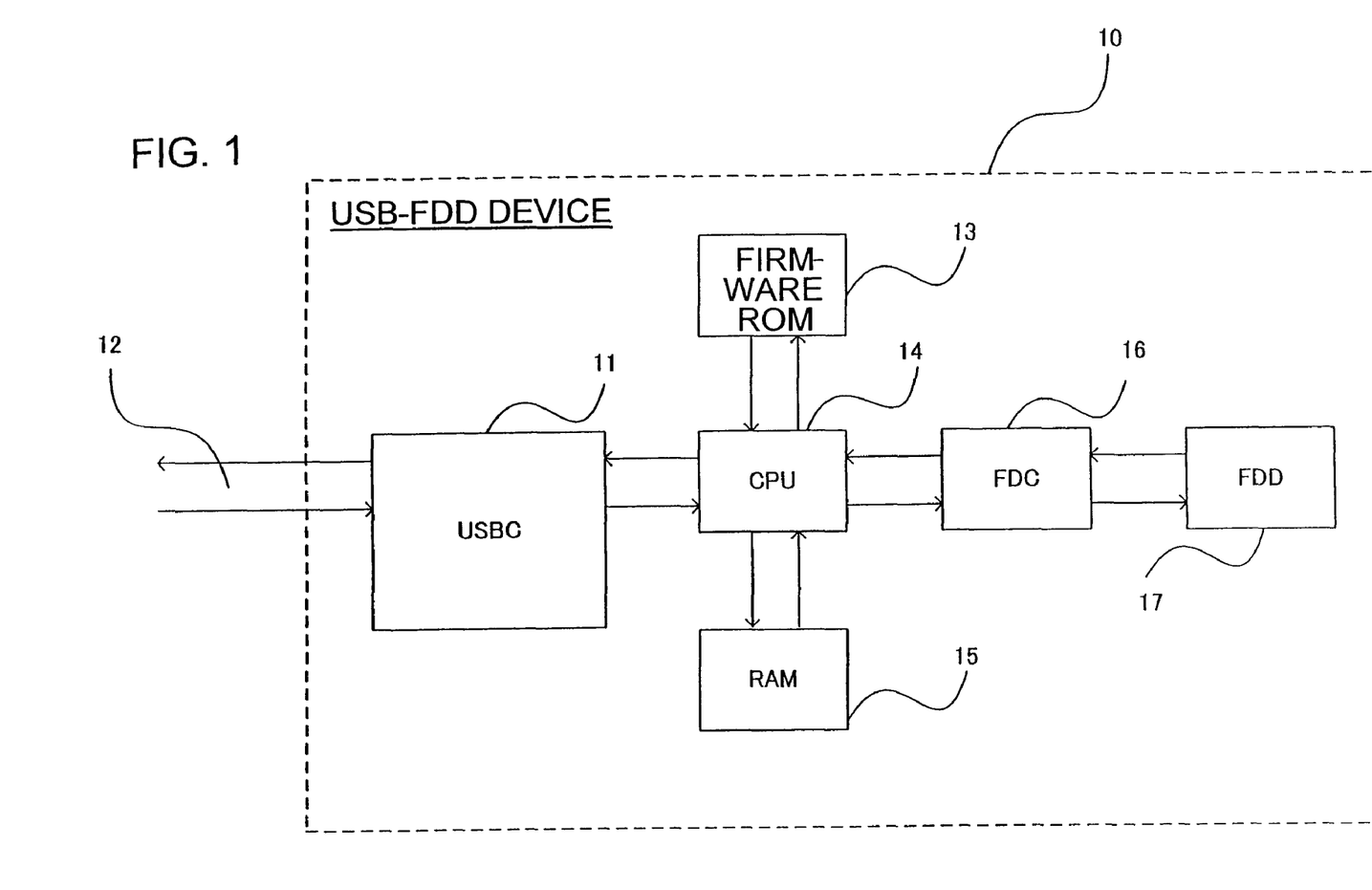
FIG. 1 shows an arrangement of an USB-FDD unit 10 according to the invention.

Referring to FIG. 1, there is shown an USB-FDD unit 10 according to the invention. The USB-FDD unit 10 has:

an USB controller (USBC) 11 adapted to communicate with an external device via an USB bus 12;

an FD control unit (FDC) 16 and an FDD 17 together serving as FD control means for controlling read from and write to an FD;

a firmware ROM 13 for storing a program;

a RAM 15 having a multiplicity of buffer spaces and serving as a buffer means; and a CPU 14 for controlling the elements described above to execute a given program.

The invention enables fast read/write from/to an FD in accordance with the use condition of storage disk drive, and, if the use condition permits, the capacity of the RAM 15 serving as the read/write buffer means is reduced. The invention may cause the RAM 15 to accommodate its buffer spaces in accordance with the use condition of the storage disk drive and the need of the RAM for other purposes. To do so, a buffer management table is provided.

The buffer management table has part or all of the capability of:

indicating which of the buffer spaces are allocated to a given sector;

indicating which sectors share common buffer spaces;

setting a flag for a sector, indicating that the data of the sector has not been processed;

varying the number of the sectors sharing the common buffer spaces in accordance with the RAM capacity available as the buffer spaces; and varying the capacity of the RAM for use as the buffer means.

This buffer management table is stored in the firmware ROM 13 for example, and is retrieved therefrom and written to the RAM 15 under the control of the CPU 14. The buffer management table can be alternatively implemented in hardware using a separate device.

Figure 2:
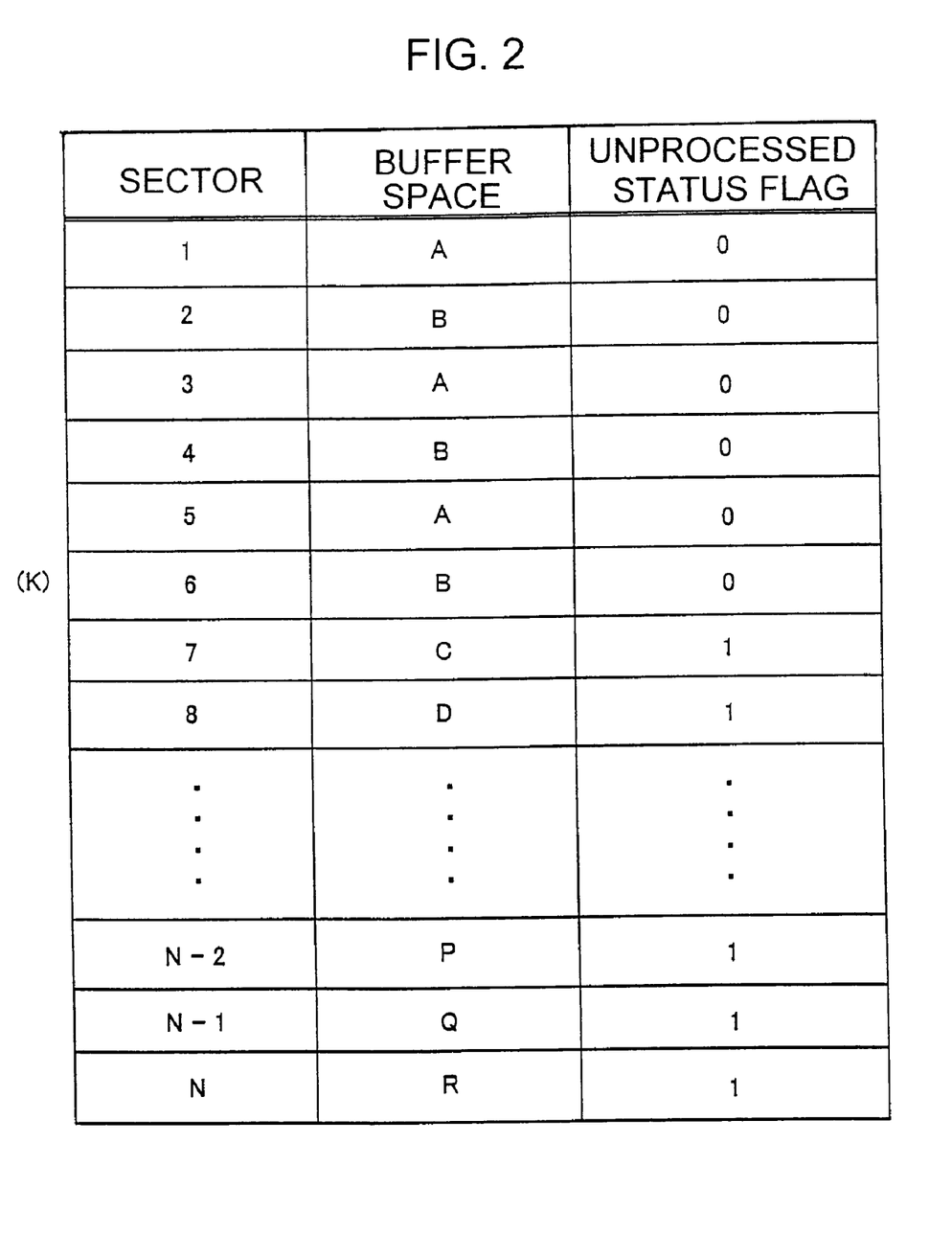
FIG. 2 shows a structure of a buffer management table used in read.
Figure 3:
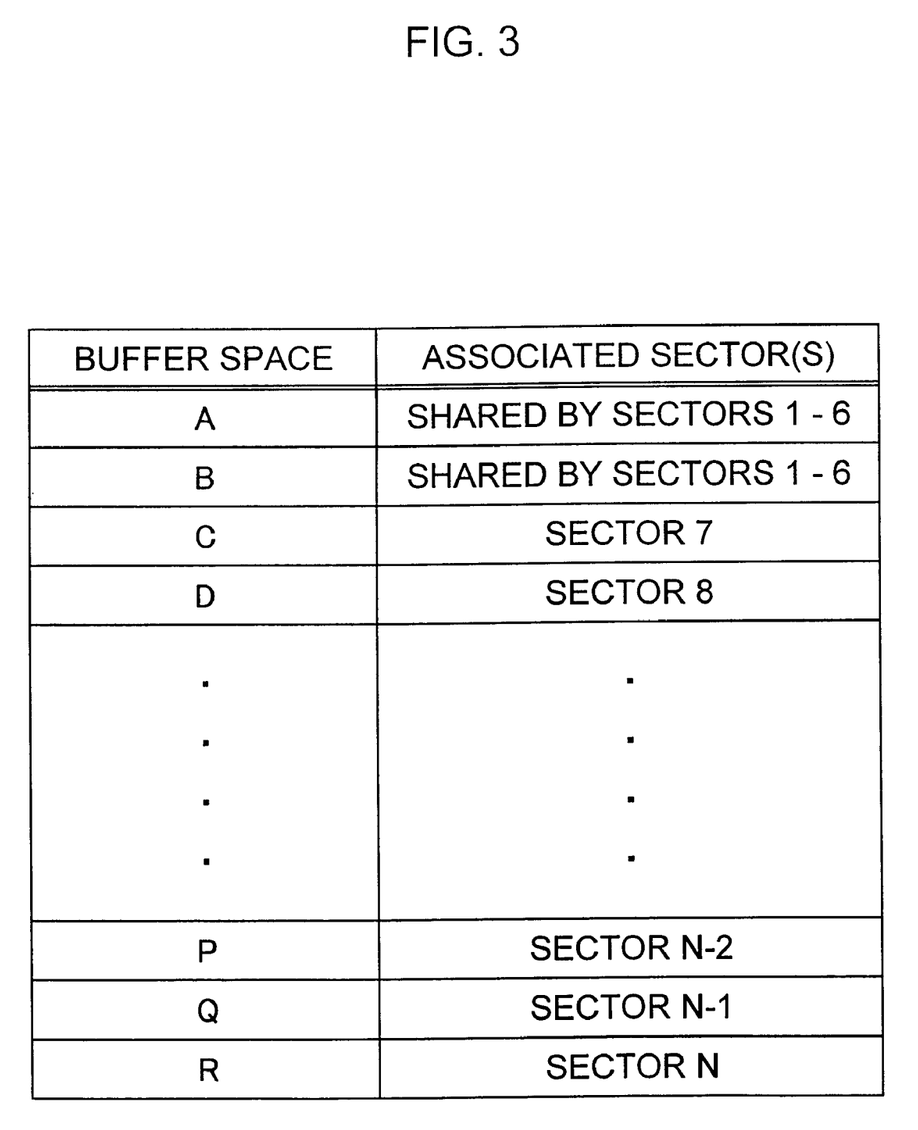
FIG. 3 shows a correspondence established between the buffer spaces and sectors of FIG. 2.
Figure 4:
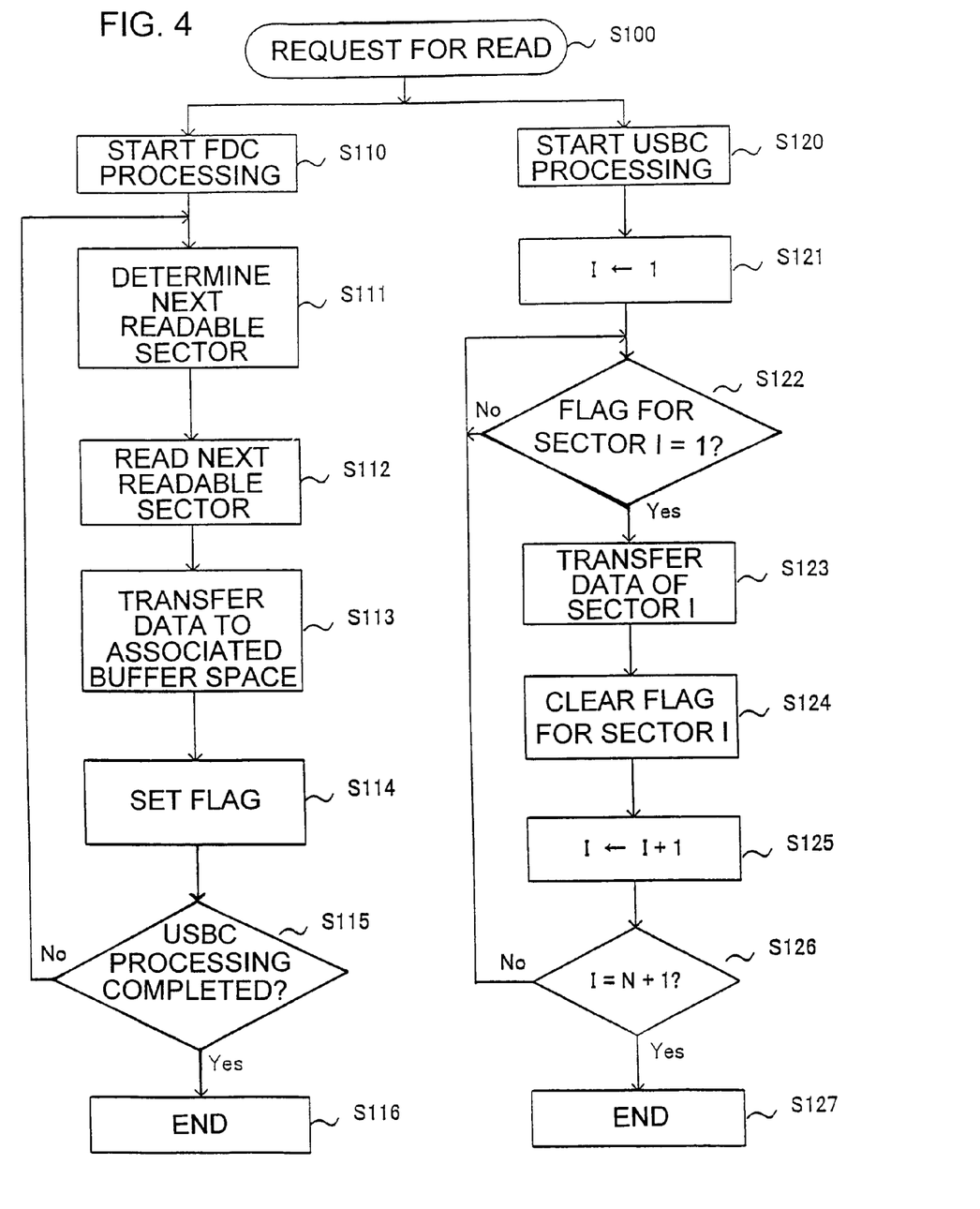
FIG. 4 is a flowchart describing the procedure of a read operation.

Referring to FIGS. 2-4, a procedure to read data from an FD and transfer it to the USB 12 (the procedure hereinafter referred to as read operation) will now be described.

FIG. 2 shows a structure of the buffer management table used in read. As shown in FIG. 2, a multiplicity N of sectors are numbered 1 through N (the sectors referred to as sectors 1 through N). Buffer spaces are named A through R in association with respective sectors 1 through N. The multiplicity N is 256 for example, and the number of buffer spaces is set in the range from 50 to 90%, preferably about 75%, of N. The multiplicity N and the ratio of the buffer spaces to N can be respectively changed as needed.

Of the buffer spaces of the RAM 15, buffer spaces A and B are used as common buffer spaces and allocated for the leading K sectors (sectors 1 through K (<N), with K being 6 in the example shown herein). On the other hand, individual buffer spaces of the RAM 15 are respectively allocated for sectors K+1 (which is 7 in the example shown herein) through N.

The common buffer spaces A and B are adapted to serve together as a ring buffer for two sectors. That is, in one phase the ring buffer stores the data read from the FDC 16 in buffer space A, and at the same time send the data stored in buffer space B to the USBC 11. In the other phase, the role of common buffer spaces A and B are interchanged. Thus, data are sent out in sequence from sectors 1-6 to the USBC. Although the invention is described with reference to two buffer spaces serving as common buffer spaces, it will be apparent that more than two buffer spaces can be used as common buffer_spaces.

An unprocessed status flag is set to "1" when the FDC 16 has read data but the USBC 11 has not transmitted the data yet. FIG. 2 illustrates a case where unprocessed status flag are set for the sectors 7-N associated with the individual buffer spaces C-R and flags are cleared (or reset) for the sectors 1-6 associated with common buffer spaces A and B.

FIG. 3 shows an interrelationship between buffer spaces A-R and the sectors 1-N of FIG. 2. It is seen that buffer spaces A and B are allocated to be shared by the sectors 1-6, while the individual buffer spaces C-R are respectively allocated to the sectors 7-N.

FIG. 4 is a flowchart describing a procedure for a read operation. As shown in FIG. 4, when a read request is made (Step S100), the read head is first moved to the target track of the FD. Simultaneously with the start of data processing by the FDC (hereinafter referred to as FDC processing) (Step S110), data processing by the USBC (hereinafter referred to as USBC processing) is also started (Step S120).

In the FDC processing, the sector number of the sector currently positioned at the head of the FDD 17 (the sector number hereinafter referred to as rotational position of the FD) is obtained in step S111 by, for example, issuing an ID command. The sector to be read next (referred to as next readable sector) is then determined based on the rotational position of the FD. In order to read the complete data of the next readable sector, the next readable sector is defined to be the sector next to the one located at the rotational position of the FD.

The data of the sector is read in step S112. In step S113, the data read from the sector is stored, i.e. buffered, in the buffer space allocated for the sector in accord with the buffer management table shown in FIG. 2.

In step S114, an unprocessed status flag is set to the sector. In setting this flag, if that sector is one of the sectors 1 through K, flags of other sectors are all cleared provided that they are associated with the same buffer space as that sector. That is, if the buffer space allocated for that sector is one of the common buffer spaces (spaces A and B in the example shown), the existing data in the common buffer space is over written with the data of that sector. Then, the flags for said other sectors are cleared, since the previous data associated with other sectors will be over written and not transmitted any longer.

However, if the sector is associated with one of the individual buffer spaces K+1 (sector 7 in the example shown in FIG. 2) through N, then the procedure only sets a flag for the sector and clears no flag in step S114, since none of the data stored in the individual buffer spaces is overwritten.

The FDC processing, steps S111-S114, is repeated until a confirmation is made in step S115 that the USBC processing has been completed.

It is noted that in the initial stage of a read operation, the next readable sector in step S111 may be defined to be the sector K+1 if the rotational position of the FD is within the sectors 1 through K and to be the sector next to the one currently located at the rotational position of the storage disk if the rotational position has passed sector K.

Coming back to step S113, if, in the initial stage of the read operation, the data to be read out from said sector in step S112 belongs to one of sectors 1 through K, buffering the data for that sector may be skipped to start sequential buffering with sector K+1.

That is, in the initial stage of the FDC processing (in the initial stage of a read operation) read from the FD and write to a buffer space may be skipped if the rotational position of the FD is within sectors 1 through K, since the data of these sectors would be overwritten in the course of the FDC processing if they were read out and stored in a buffer space A or B. Thus, the wasteful data processing in the initial stage of a read operation can be omitted.

In the USBC processing, a sector variable I that refers to the number of the sector to be transferred is initialized to 1 in step S121, since it is necessary to sequentially transfer data from the USBC 11 to the USB 12 in an ascending order of the sectors, starting from sector 1. In what follows, the sector referred to by the sector variable I will be simply referred to as sector I.

In step S122, a determination is made as to whether the flag for sector I is 1 or not. If it is not, the procedure awaits until the flag is set to 1. When the flag is 1, it implies that the data of the sector has been read by the FDC 16 but has not been transmitted from the USBC 11.

Then, the data of sector I is transmitted therefrom in step S123, and the flag for sector I is cleared (i.e. reset to 0) in step S124. Subsequently, the sector variable I is incremented by 1 in step S125.

In step S126, a determination is made as to whether the sector variable I has become N+1. Steps S122-125 are repeated until the sector variable I is incremented by 1. When the sector variable I has become N+1, implying that all the data of sectors 1 through N have been transferred to the USB 12, the USBC processing is ended (step S127). Ending of USBC processing in step S115 also causes the FDC processing to be ended (Step S116).

As described above, the next readable sector in the read operation is determined in the FDC processing based on the rotational position of the FD, and the data read is stored in the buffer space allocated to that sector. Thus, while the rotational position of the FD is within sector numbers 1 and K in the initial stage of the read operation, the procedure may be adapted to read the sector twice or to skip reading the sector for the first time. In the USBC processing, data of the N sectors are sequentially transferred to the USB 12 starting with the leading sector, as in the Patent Document 1. Thus, in principle, the data transfer will be slightly delayed as compared to that of the Patent Document 1. However, by optimizing the data transfer rate of the USB (taking account of sharing thereof with other devices), data processing time (taking account of sharing conditions), and the number of sectors to be associated with common buffer spaces, one may anticipate substantially the same speed (i.e. data transfer rate) in the invention as compared with the Patent Document 1 that secures buffer spaces for all the sectors in read operation.

Figure 5:
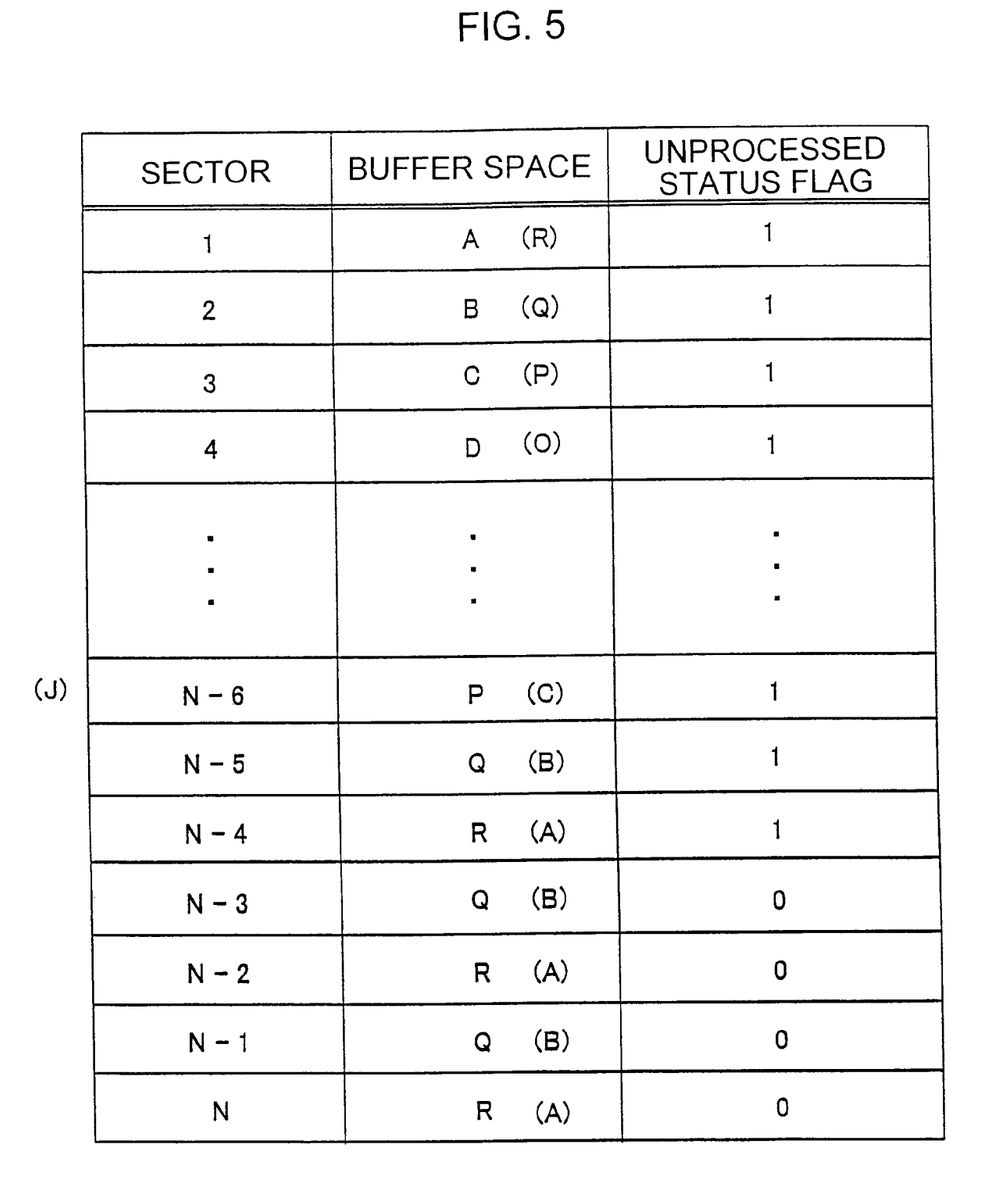
FIG. 5 shows a structure of the buffer management table used in write.
Figure 6:
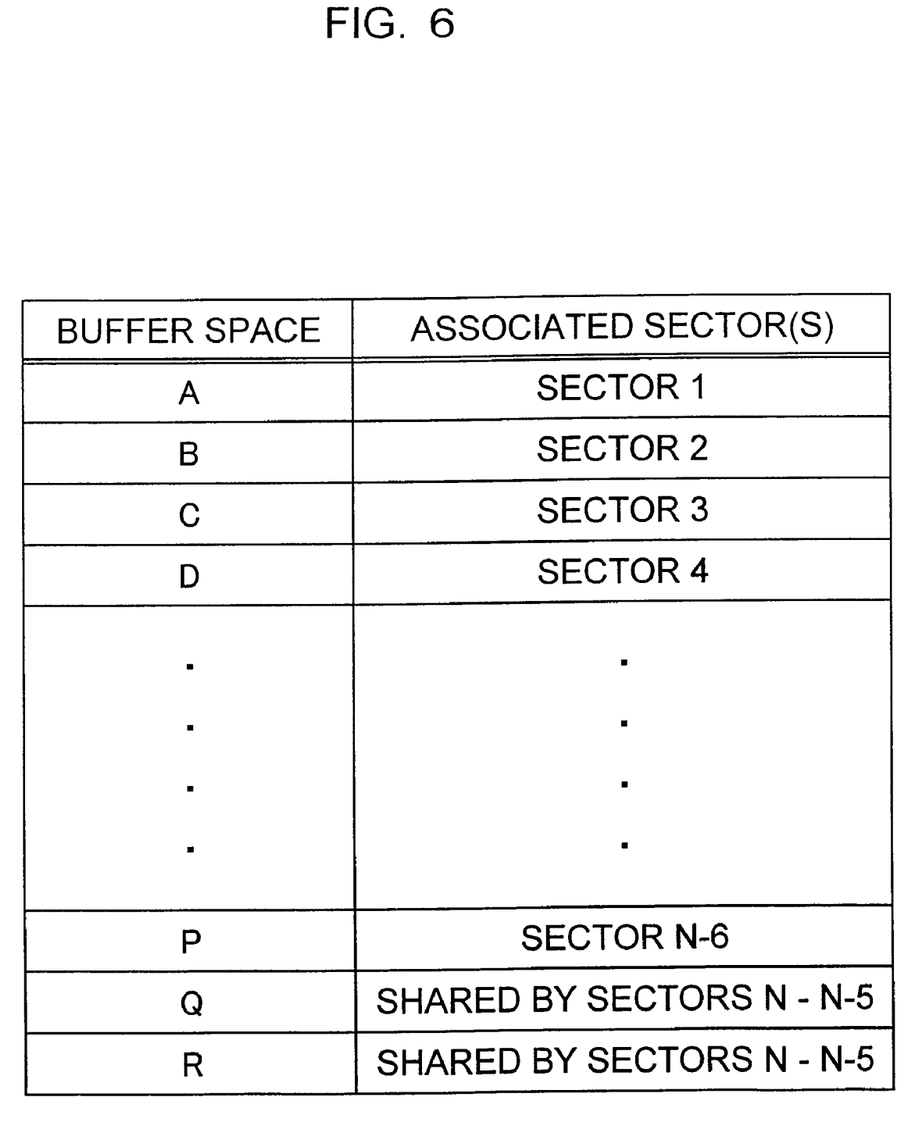
FIG. 6 shows a correspondence established between the buffer spaces and sectors of FIG. 5.
Figure 7:
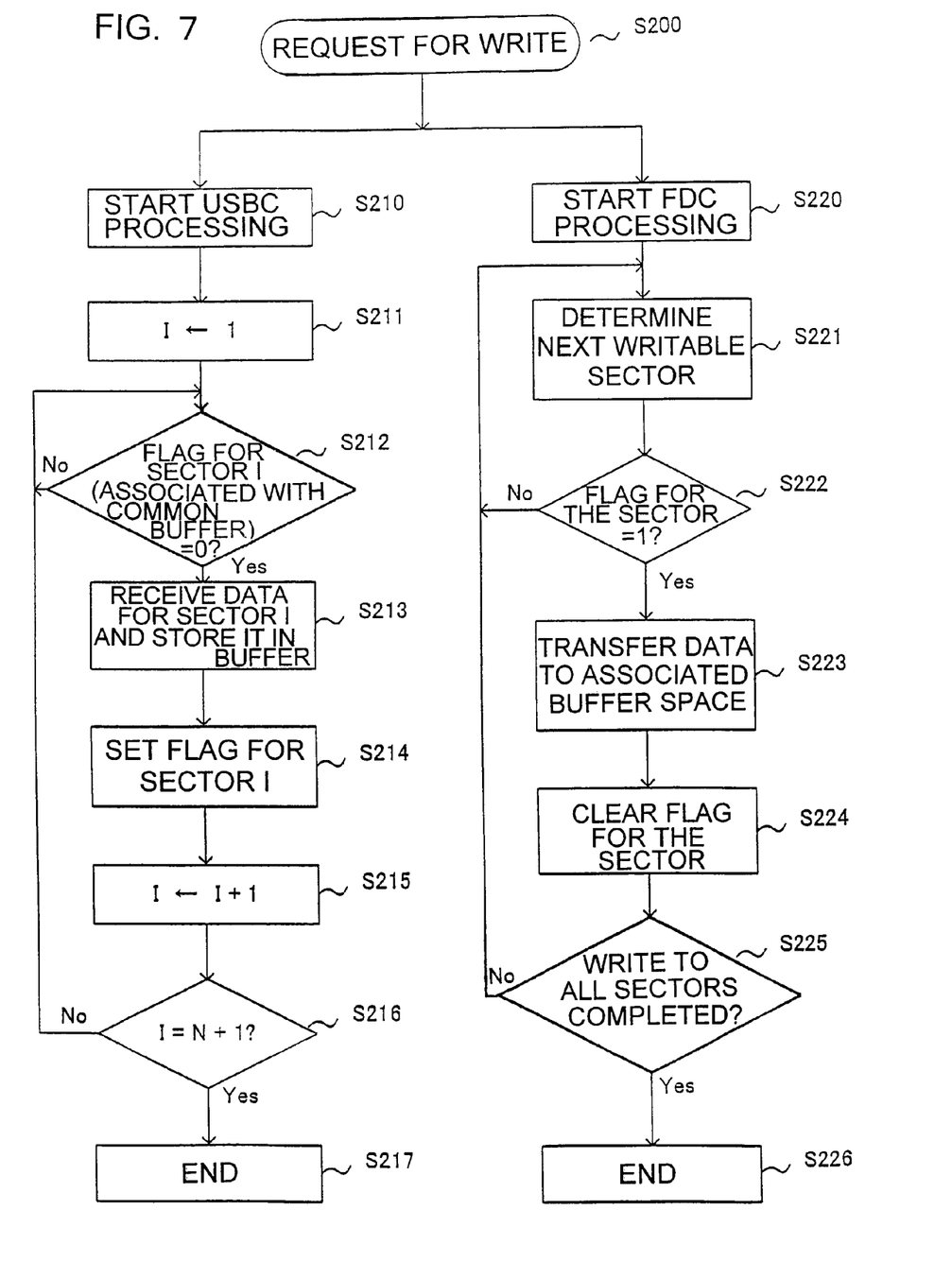
FIG. 7 is a flowchart describing the procedure of a write operation.

Referring to FIGS. 5-7, a procedure for receiving data from the USB and writing the data to the sectors of an associated track of an FD (the procedure hereinafter referred to as write operation) will now be described.

FIG. 5 shows a structure of a buffer management table for use in a write operation, which is basically similar to that shown in FIG. 2 for a read operation.

The buffer management table of FIG. 5 is configured to attain efficient reception of data of the pertinent track transferred from the USBC, starting with the data of sector 1.

It is shown in the table that individual buffer spaces of the RAM 16 (buffer means) are allocated to sectors 1 through J (with J being a predetermined number such that J<N, and J=N−6 in the example shown herein), while common buffer spaces Q and R of the RAM 15 are allocated to sectors (N−5) through N.

Common buffer spaces Q and R together serve as a ring buffer incorporating buffer spaces for two sectors. That is, when data is received from the USBC 11, it is stored in buffer space Q and at the same time the data stored in buffer space R is written to the FD, thanks to the FDC 16 and FDD 17. The ring buffer repeats this operation to write data of sectors N−5 through N to the FD by interchanging the roles of common buffer spaces Q and R in turn.

An unprocessed flag "1" is set when data is received by the USBC 11 but not written yet by the FDC 16 and FDD 17. Incidentally, FIG. 5 represents an instance where unprocessed status flags are set for the sectors 1 through N−6 associated with the individual buffer spaces A-P and for the sectors N−5 and N−4 associated with common buffer spaces Q and R, while flags for the sectors N−3 through N associated with common buffer spaces A and B have been cleared.

It is noted that as shown in FIG. 5 the correspondence between the sectors and associated buffer spaces is reversed in order as compared with that of FIG. 2. This preferred reverse correspondence can be seen more clearly if the correspondence is given in terms the buffer space addresses of FIG. 2 (parenthesized in FIG. 5). By reversing the correspondence in this manner, it becomes easy to administer the buffer management table in the read or write operations.

FIG. 6 shows the correspondence between the sectors 1 through N and buffer spaces A through R, in the ascending order of the buffer spaces. It is seen that buffer spaces Q and R are shared by sectors N−5 through N, and buffer spaces A through P are individually allocated to respective sectors 1 through N−6.

FIG. 7 is a flowchart describing a procedure of a write operation. As shown in FIG. 7, when a write request is made (step S200), the head is moved to the target track of the FD to start the USBC processing (step S210) and FDC processing (step S220) simultaneously.

In the USBC processing, the sector variable I indicative of the sector number (or the rotational position of the storage disk) is initialized to 1 in step S211. In this way, sector data transferred from the USB 12 are received by the USBC 11 in the ascending order of the sectors, starting with sector 1, in order to execute data transfer and reception quickly and efficiently. In what follows, the sector referred to by the sector variable I will be simply referred to as sector I.

In step S212, a determination is made as to whether the flag for sector I associated with a common buffer space is 0 or not, and, if it is, the procedure proceeds to step S213. If the flag is not 0, however, the procedure waits for the clearance of the flag. Nevertheless, the procedure does not wait for clearance of a flag for sectors 1 through N–4, since the buffer management table has the structure as shown in FIG. 5. It may happen that a flag is determined to be 1 for a sector subsequent to sector (N–3), when the procedure will wait for the clearance of that flag.

When the data of sector I is received, it is stored in an associated buffer space in step S213. In step S214, the flag for sector I is set to 1. The sector variable I is subsequently incremented by 1 in step S215.

In step S216, a determination is made as to whether the sector variable I is N+1 or not. Steps S212-S215 will be repeated until the sector variable I becomes N+1. When the sector variable I is N+1, implying that the data of all the sectors 1 through N of the track have been stored in the associated buffer spaces, the USBC processing is ended (in step S217).

In the FDC processing, the rotational position of the FD relative to the head of the FDD 17 is obtained in step S221 by issuing, for example, an ID command. The next writable sector is determined based on the rotational position of the FD. To ensure complete write of all the data received, the next writable sector is defined to be the sector next to the one currently located at the rotational position of the FD.

In step S222, a determination is made as to whether the flag for the next writable sector is 1 or not. If it isn't, the procedure returns to step S221 to determine the flag for the next writable sector that is to be updated next in course of the rotation of the FD.

If in step S222 the flag is determined to be 1, data is written to that sector in step S223. In step S224, the flag for the sector to which data has been transferred from its buffer space is cleared or reset to 0.

These steps S221-S224 that constitute the FDC processing are repeated until it is confirmed in step S225 that write to all the sectors is completed. When write to all the sectors is completed, the FDC processing is ended (step S226).

It is noted that there may be a case in which the FDC processing catches up with the USBC processing, depending on the speed of the FDC processing relative to that of the USBC processing. In that case, the data received by the USBC may be directly transferred to the FDC without storing it in the buffer means (RAM 16) to shorten write time.

As described above, in the USBC processing in a write operation, data are received from the USB 12 in the correct sequential order starting with sector 1, in the same manner as in the Patent Document 1. The FDC processing is simultaneously started with the USBC processing. However, the data to be written to the next writable sector may not have been received yet (that is, the data may not have been buffered in the associated buffer spaces yet), depending on the rotational position of the FD. As a consequence, in principle, some delay may arise in write operations as compared with the Patent Document 1. By optimizing the data transfer rate of the USB and the data processing time of the USBC, taking account of sharing conditions with other devices, and by setting up an appropriate number of sectors in association with common buffer spaces, the invention may provide substantially the same data transfer rate as compared with the Patent Document 1 which utilizes buffer spaces for all the sectors also in a write operation.

According to the invention, the number of the buffer spaces available in the buffer means 15 for use to transfer data in read and write can be increased or decreased as needed. Accordingly, an optimum system can be established that takes account of a trade-off between the storage capacity and the speed of the buffer means (RAM buffer) without changing the hardware configuration of the buffer means.

It should be kept in mind that the USB-FDD unit 10 should be compatible with different formats of FD, so that a required speed and/or a buffer capacity can vary with the format used. Given a format of an FD, the invention manages to change the buffer means 15 so as to provide maximum performance of the buffer means. Thus, if the usable number of buffer spaces is limited to N for example, the invention still exploits the buffer resource to its full capacity to obtain maximum performance of the resource. In cases where a high speed is not a critical requirement for the USB-FDD unit, the number (N) of the buffer spaces for use in the buffer means may be lessened to utilize the residual capacity of the RAM (i.e. RAM capacity not used for buffer spaces) for other purposes. Alternatively, the buffer resource (hardware RAM) can be economized.

INDUSTRIAL APPLICABILITY

A method of reading/writing data from/to a storage disk of the invention enables high-speed operation of a storage disk drive such as an FDD connected to a serial data transfer means such as an USB in accordance with the use condition of the storage disk drive. The operation can be done with a reduced RAM capacity.

The invention claimed is:

1. A storage disk control unit, comprising:
   serial data transfer means;
   buffer means;
   storage disk control means;
   a buffer management table for establishing correspondence between a multiplicity N of sectors of a storage disk and a group of buffer spaces of said buffer means including common buffer spaces and individual buffer spaces; and
   a CPU, connected to each of said serial data transfer means, buffer means, and storage disk control means and said buffer management table, for controlling said serial data transfer means, buffer means and storage disk control means and said buffer management table, wherein
   (1) in a read operation, said CPU is adapted to
   set said buffer management table such that said common buffer spaces of said buffer means are allocated to the first K sectors (K<N), where K is a predetermined integer, and said individual buffer spaces of said buffer means are allocated to sectors K+1 through N;
   repeat a sequence of steps for each of said N sectors in response to a read request, said sequence including steps of
     (i) determining the sector to be read next corresponding to the next readable sector based on the current rotational position of said storage disk,
     (ii) reading data from said next readable sector, (iii) storing said data read from said next readable sector in step (ii) in the buffer space allocated to said next readable sector, and (iv) setting an unprocessed status flag indicative of said stored data being unprocessed for the sector whose data has been stored in its associated buffer space, repeat a sequence of steps for each of said N sectors in the order of the sectors starting with sector 1, in response to said read request, said sequence including steps of (v) transferring data, via said serial data transfer means, from a buffer space allocated to a sector to an external device, on condition that an unprocessed status flag is set for that sector, and (vi) clearing the unprocessed status flag for the sector whose data has been transferred from its associated buffer space;

(2) in a write operation, said CPU is adapted to set said buffer management table such that said individual buffer spaces of said buffer means are allocated to sectors 1 through J (J<N), where J is a predetermined integer, and said common buffer spaces of said buffer means are allocated to sectors J+1 through N;

repeat a sequence of steps for each of said N sectors in the order of the sectors starting with sector 1, in response to a write request, said sequence including steps of (vii) storing the data received from an external device via said serial data transfer means in a buffer space allocated to a sector, on condition that an unprocessed status flag has been cleared for that sector, and (viii) setting an unprocessed status flag for the sector whose data has been stored in its associated buffer;

repeat a sequence of steps for each of said N sectors in response to said write request, said sequence including steps of (ix) determining the next writable sector based on the current rotational position of said storage disk, (x) writing data to said next writable sector, on condition that an unprocessed status flag is set to said next writable sector, and (xi) clearing the flag for the sector to which said data has been written.

2. The storage disk control unit according to claim 1, wherein said numbers K, J, and N satisfy J=N−K.

3. A method of reading data from a storage disk having a multiplicity N of sectors by use of a storage disk drive that includes serial data transfer means and buffer means, said method comprising:

a step of allocating common buffer spaces of said buffer means to sectors 1 through K (K<N) of said storage disk, where K is a predetermined integer, and allocating individual buffer spaces of said buffer means to sectors (K+1) through N of said storage disk;

a sequence of steps repeated for each of said N sectors in response to a read request, said sequence including steps of (i) determining the sector to be read next corresponding to the next readable sector based on the current rotational position of said storage disk, (i) reading data from said next readable sector, (iii) storing said data read from said next readable sector in the buffer space allocated to said next readable sector, and (iv) setting an unprocessed status flag indicative of said data stored being unprocessed for the sector whose data has been stored in its associated buffer space; and a sequence of steps also repeated for each of said N sectors in the order of the sectors, starting with sector 1, in response to said read request, said sequence including steps of (v) transferring data, via said serial data transfer means, from a buffer space allocated to an associated sector to an external device, on condition that an unprocessed status flag is set for that sector, and (vi) clearing the unprocessed status flag for the sector whose data has been transferred from its associated buffer space.

4. The method of reading data from a storage disk according to claim 1, wherein in the initial stage of a read operation, said next readable sector determined in said step (i) is the sector K+1 if the rotational position of said storage disk lies within the range from sector 1 through sector K, while the next readable sector is the sector next to the one currently located at the rotational position of said storage disk if said rotational position has passed sector K.

5. The method of reading data from a storage disk according to claim 1, wherein in the initial stage of a read operation if, in step (iii) of storing (or buffering) data of a sector in an associated buffer space, said data belongs to one of sectors 1 through K, then buffering said data is skipped to start sequential buffering with sector K+1.

6. The method of reading data from a storage disk according to claim 1, wherein said next readable sector determined in said step (i) is the sector next to the one at the rotational position of said storage disk irrespective of the sector number of said sector located at said rotational position in the initial stage of a read operation, and said data is stored (buffered) in an associated buffer space in step (iii) in the initial stage of the read operation, irrespective of the number of the sector read in step (ii).

7. The method of reading data from a storage disk according to claim 1, wherein the next readable sector determined in said step (i) is the sector next to the one located at the rotational position of said storage disk, and all the flags for the sectors associated with the same buffer spaces as said next readable sector are cleared in step (iv) if said next readable sector belongs to sectors 1 through K.

8. The method of reading data from a storage disk according to claim 1, wherein said common buffer spaces include at least two buffer spaces together forming a ring buffer.

9. A method of writing data to a multiplicity N of sectors of a storage disk using a storage disk drive that includes serial data transfer means and buffer means, said method comprising:

a step of allocating individual buffer spaces of said buffer means to the sectors 1 through J (J<N) of said storage disk, where J is a predetermined integer, and allocating common buffer spaces of said buffer means to sectors J+1 through N of said storage disk;

a sequence of steps repeated for each of said N sectors in the order of the sectors, starting with sector 1, in response to a write request, said sequence including steps of (i) storing the data received from an external device via said serial data transfer means in an associated buffer space, on condition that the unprocessed status flag has been cleared for the sector associated with said buffer space, and (ii) setting an unprocessed status flag for the sector whose data has been stored in its associated buffer;

a sequence of steps repeated for each of said N sectors in response to said write request, said sequence including steps of
(iii) determining the next writable sector based on the rotational position of said storage disk,
(iv) writing data in said next writable sector, on condition that an unprocessed status flag is set for said next writable sector, and
(v) clearing the unprocessed status flag for the sector to which data has been written.

10. The method of writing data to a storage disk according to claim 9, wherein said next writable sector determined in said step (iii) is the sector next to the one located at the rotational position.

11. The method of writing data to a storage disk according to claim 9, wherein said common buffer spaces include at least two buffer spaces together forming a ring buffer.

* * * * *